UNITED STATES PATENT OFFICE.

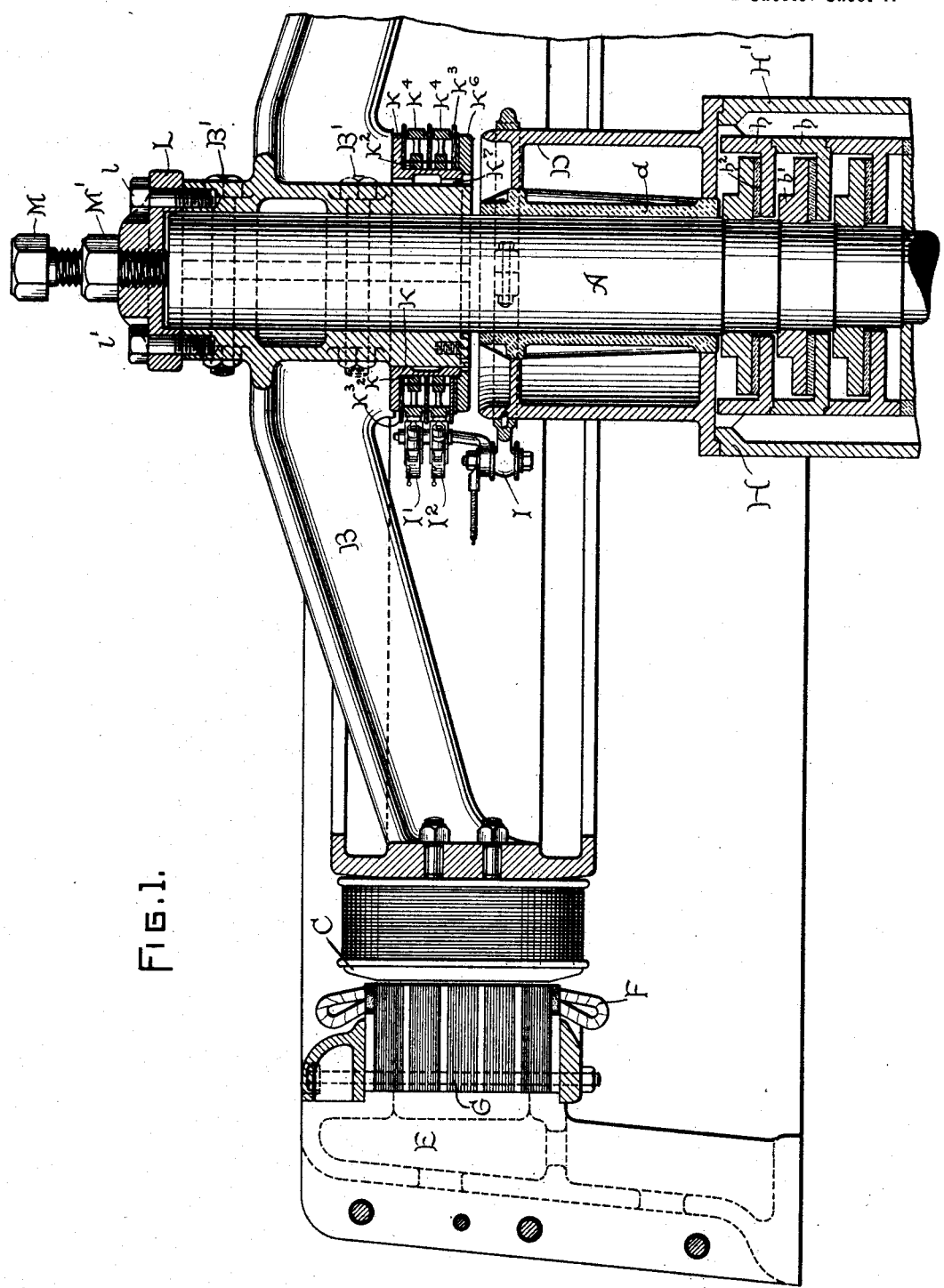

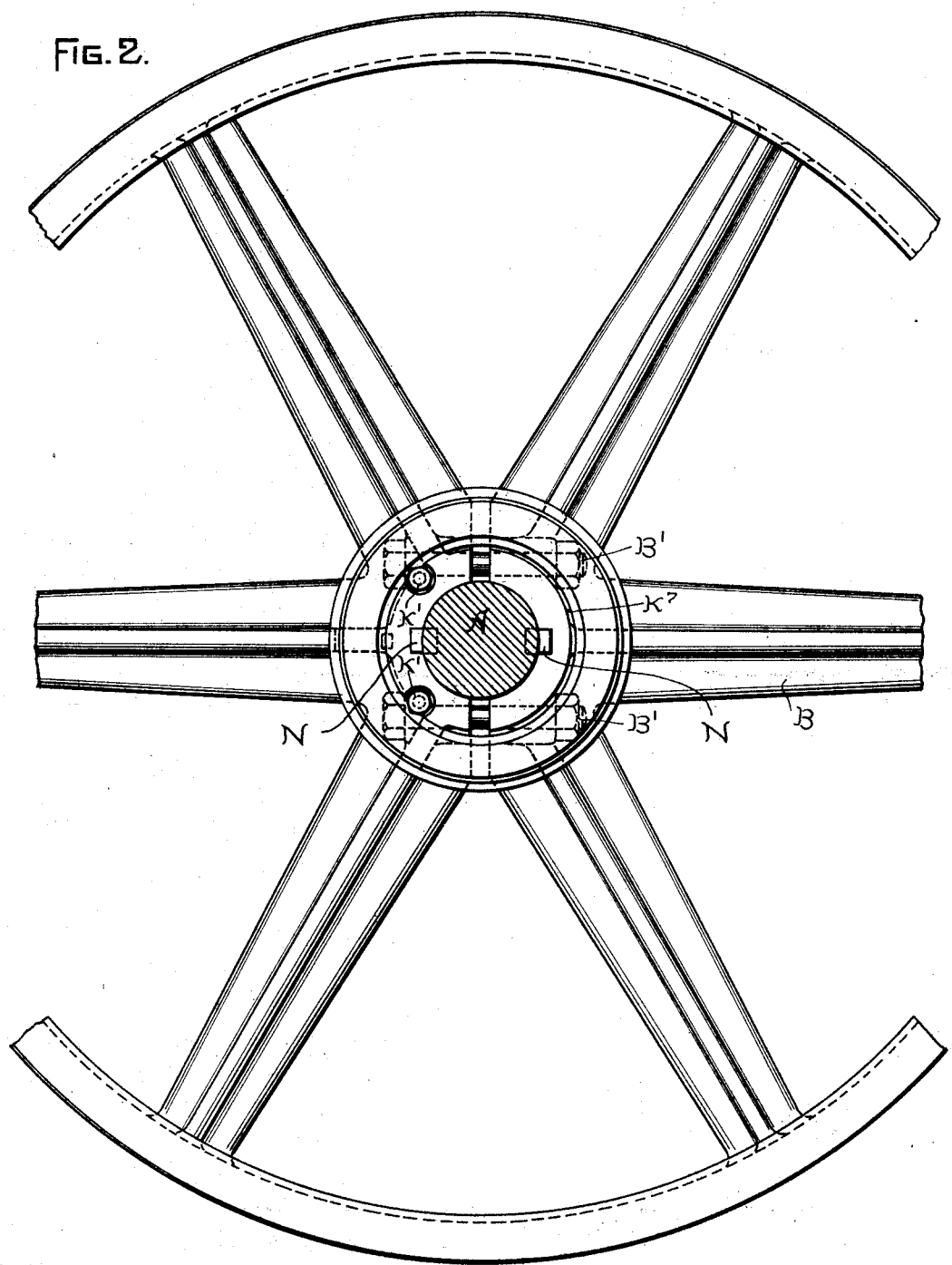

SAMUEL S. FORSTER, OF SCHENECTADY, NEW YORK, ASSIGNOR TO THE GENERAL ELECTRIC COMPANY, OF NEW YORK.

DYNAMO-ELECTRIC MACHINE.

SPECIFICATION forming part of Letters Patent No. 619,296, dated February 14, 1899.

Application filed November 14, 1898. Serial No. 696,332. (No model.)

*To all whom it may concern:*

Be it known that I, SAMUEL S. FORSTER, a subject of the Queen of Great Britain, residing at Schenectady, in the county of Schenectady and State of New York, have invented certain new and useful Improvements in Dynamo-Electric Machines, (Case No. 892,) of which the following is a specification.

My present invention relates to adjusting the position of the revolving field in horizontal dynamo-electric machines, such as those driven by turbines with a vertical shaft. In such machines it is necessary to provide a means for adjusting the vertical-position field-magnet centrally within the armature, and this must be so arranged that as the thrust-bearing wears the field may be shifted from time to time to compensate for the wear. A difficulty has arisen with this form of construction. The ordinary method of adjusting the field has been to split the hub and fasten the spider by bolts upon the vertical shaft, with an adjusting set-screw on the end of the shaft. When the field is to be shifted, the securing-bolts are slacked and the set-screw turned till the field is again central with the armature. With this form the collecting-rings used to convey current to the field-magnet winding must in general be split also. This is objectionable, since no matter how close the joint may be there is a liability to slight sparking at the brushes and other objections which are well known. I obviate the difficulties thus pointed out without changing the means for adjusting the field by securing the collector-rings to one side only of the spider, leaving a little play between the other side of the rings, which can be made integral with this construction, and the hub of the field.

The arrangement will be better understood from the appended drawings, in which—

Figure 1 shows in section a part of a horizontal dynamo having the invention applied thereto; and Fig. 2 is an inverted plan view showing the shaft in section, with the spider and collector-rings in place.

In Fig. 1, A is the shaft. B is the spider. C is one of the field-magnet poles, and E is the armature, of which F is one of the coils and G the laminated core. These parts are all well known. The bolts securing the spider in place are shown at B' B'. The plate L is secured by the screws $l$ $l'$ to the end of the spider, and the set-screw M, with the lock-nut M', furnishes the means of longitudinal adjustment, already referred to. The collector-rings $K^4$ $K^4$ are supported in the usual way by an internal ring K and the rings $K^2$ $K^2$, which are shrunk over the internal ring, insulation $K^3$ being provided wherever desired. A flange $K^6$, secured to the hub of the spider, supports the collector-rings on the under side. Fixed to the box D of the thrust-bearing is a stud I, which carries brushes I' $I^2$. The thrust-bearing box D has a lining $d$ of Babbitt metal to preserve the alinement of the shaft, and the thrust-bearing H is provided with an outer box H' and a nest of registering rings $h$ $h$. The shaft, as will be seen, is shouldered, and rings $h'$ are secured to it at each shoulder in any desired manner, (not illustrated,) Babbitt metal $h^2$ being used wherever necessary. The special form of thrust-bearing is not of my invention and is illustrated as a convenient one, for which any other might be substituted.

It will be seen that a space $K^7$ is left between the hub of the spider and the collector-ring support upon one side of the shaft, so that when the bolts B' are loosened the spider-hub may have sufficient room to expand without affecting the collecting device. Keys N N connect the hub and the shaft.

In Fig. 2 the bolts K' K' are shown securing the collector-ring in place, and the space $K^7$ is apparent, the rest of the parts being also lettered as in Fig. 1.

The operation of the device will be readily apparent without detailed description, it being manifest that when the bolts B' B' are slacked the set-screw M may be rotated after the lock-nut is released, so as to draw the spider up to compensate for the wear in the thrust-bearing H, the space between the hub and the free side of the collector permitting sufficient play to ease the bolts B' B'.

What I claim as new, and desire to secure by Letters Patent of the United States, is—

1. The combination, in a dynamo, of a split-hub spider, with an integral collecting device secured to one side only of the spider.

2. The combination in a horizontal dynamo, of a spider with a split hub, and an integral collecting device secured to one side of the spider, with a space between the hub and the free side of the collector.

3. The combination in a horizontal dynamo, of a split-hub spider, and a pair of collecting-rings fixed to one side of the hub with a space between the other side of the hub and the collector.

4. In a horizontal dynamo, the combination of a split-hub spider, a collector fixed to one side of the spider with a space between the other side of the spider and the collector, means for securing the hub to a shaft, a supporting-bearing, and means for adjusting the position of the spider without disturbing the collector when for any reason, as by wear of the bearing, the spider is out of its proper position.

5. In a dynamo, the combination of a split-hub spider, a collector fixed to one side of the spider, bolts securing the spider to the shaft, and a set-screw and lock-nut for adjusting the position of the spider relative to the shaft.

In witness whereof I have hereunto set my hand this 10th day of November, 1898.

SAMUEL S. FORSTER.

Witnesses:
B. B. HULL,
C. L. HAYNES.